United States Patent
Hirdina et al.

(10) Patent No.: US 9,314,957 B2
(45) Date of Patent: Apr. 19, 2016

(54) BLOW-MOLDING MACHINE WITH PRESSURE CYLINDER WITH FORCE EQUALIZATION MEANS FOR PISTON COMPRESSOR

(75) Inventors: Jochen Hirdina, Regensburg (DE); Heinrich Bielmeier, Pilsting-Grosskollnbach (DE); Konrad Senn, Regensburg (DE); Günter Winkler, Zell (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/129,141

(22) PCT Filed: Jul. 2, 2012

(86) PCT No.: PCT/EP2012/062820
§ 371 (c)(1),
(2), (4) Date: Jan. 21, 2014

(87) PCT Pub. No.: WO2013/004657
PCT Pub. Date: Jan. 10, 2013

(65) Prior Publication Data
US 2014/0124988 A1    May 8, 2014

(30) Foreign Application Priority Data
Jul. 5, 2011   (DE) .......................... 10 2011 106 652

(51) Int. Cl.
*B29C 49/58*   (2006.01)
*B29C 49/42*   (2006.01)
*B29C 49/78*   (2006.01)
*B29C 49/06*   (2006.01)
*B29C 49/12*   (2006.01)

(52) U.S. Cl.
CPC ............. *B29C 49/58* (2013.01); *B29C 49/4284* (2013.01); *B29C 49/06* (2013.01); *B29C 49/12* (2013.01); *B29C 49/4236* (2013.01); *B29C 49/783* (2013.01); *Y02P 70/267* (2015.11); *Y02P 70/271* (2015.11)

(58) Field of Classification Search
None
See application file for complete search history.

(56) References Cited

U.S. PATENT DOCUMENTS 6,709,611 B1 * 3/2004 Emmer et al. ............. 264/37.16
2010/0090375 A1 * 4/2010 Geltinger et al. ............. 264/529
2012/0098165 A1   4/2012 Baumgarte et al.

FOREIGN PATENT DOCUMENTS

CN        1147446 A       4/1997
DE        69903951 T2     7/2003
DE        102004014653 A1 10/2005
(Continued)

OTHER PUBLICATIONS

International Search Report for Application No. PCT/EP2012/062820 dated Dec. 10, 2013.
International Preliminary Report on Patentability for Application No. PCT/EP2012/062820 dated Jan. 7, 2014.
Translation of Written Opinion for Application No. PCT/US2012/062820 dated Dec. 10, 2013.
International Search Report for PCT/EP2012/062820.
Search report for DE 10 2011 106 652.0, dated Mar. 23, 2012.
Office Action, State Intellectual Property Office of the People's Republic of China, Application No. 201280033525.4, dated Jun. 4, 2015.

*Primary Examiner* — Monica Huson
(74) *Attorney, Agent, or Firm* — Marshall, Gerstein & Borun LLP

(57) ABSTRACT

Blow-molding machine for blow-molding plastic containers with at least one blow-molding unit for stretch blow-molding preforms by means of compressed air, wherein the blow-molding unit has a force equalization means, such that at least part of the compression force which occurs is compensated for, wherein the blow-molding unit comprises a pressure piston and pressure cylinder.

27 Claims, 13 Drawing Sheets

(56) References Cited

FOREIGN PATENT DOCUMENTS

| DE | 202009006684 | U1 | 8/2009 |
| DE | 102008061492 | A1 | 6/2010 |
| DE | 102009019008 | | 10/2010 |
| EP | 0 754 537 | A1 | 1/1997 |
| WO | WO-9625285 | A1 | 8/1996 |
| WO | WO-2005092594 | A1 | 10/2005 |

* cited by examiner

BLOW-MOLDING MACHINE WITH PRESSURE CYLINDER WITH FORCE EQUALIZATION MEANS FOR PISTON COMPRESSOR

CROSS-REFERENCE TO RELATED APPLICATION

The present application is the United States national phase of International Patent Application No. PCT/EP2012/062820, filed Jul. 2, 2012, which application claims priority of German Application No. 10 2011 106 652.0, filed Jul. 5, 2011. The priority application is incorporated herein by reference in its entirety.

FIELD OF THE DISCLOSURE

The present disclosure relates to a blow-molding machine for blow-molding plastic containers with at least one blow-molding unit for stretch blow-molding preforms by means of compressed air and to a corresponding method for blow molding containers.

BACKGROUND

In blow-molding machines for stretch blow-molding plastic containers, the container is formed from a preform and molded into a container by means of compressed air. Molding a container requires compressed air at pressures of e.g. 25-40 bar. This compressed air is typically generated by means of one or more high-pressure compressors. This compressed air is a major energy consumer in the value chain of a container production process, for instance in addition to polyethylene terephthalate (PET). As energy consciousness is growing, one is looking for ways to reduce air consumption. Various compressed-air recycling systems and special bottle forms are offered by the blow-molding technology in reaction thereto so as to reduce the energy consumption.

However, the question arises whether in the generation of compressed air substantial energy savings can be made. To increase the efficiency of a compressor for providing compressed air, it would in principle be possible to provide a large pressure piston, so that the air used for blowing can be compressed approximately adiabatically. During relaxation the pressure piston would then return to its original position, whereby in strictly arithmetical terms the energy efficiency of the blow-molding process can be increased. However, a problem is the high pressure needed for blow molding. This requires the application of very large forces for the pressure piston, especially in the final phase of the piston compression process. For example, in the case of a piston surface area of 1 $dm^2$, the compression force would be about 40 kN. The application of such a compression force with a corresponding piston at a sufficient piston speed of for example 10 m/s would be very difficult and costly. The air is cyclically compressed by the pressure piston in the prior art. The forces required for air compression air are almost linearly increasing under isothermal aspects. It follows that the force required for compression is not delivered in a constant manner, but peak loads are alternating with empty phases.

DE 10 2009 019 008 A1 shows a method used for blow-molding containers, wherein a preform is shaped, after thermal conditioning, inside a blow mold of a blow-molding machine by influence of blow pressure in the container. At least a portion of the pneumatic pressure energy stored inside the blow-molded container is converted into mechanical drive energy.

SUMMARY OF THE DISCLOSURE

Given the problems outlined above, it is one aspect of the present disclosure to significantly enhance the efficiency of a piston compressor within a blow-molding machine for blow molding and thus to contribute to energy savings.

The disclosure provides a blow-molding machine for blow-molding plastic containers having at least one blow-molding unit for stretch blow-molding preforms by means of compressed air, wherein the blow-molding unit comprises a force equalization means, such that at least part of the compression force arising is compensated, wherein the blow-molding unit comprises a pressure piston and a pressure cylinder.

With the force equalization means it is possible to achieve a more uniform drive load, such as e.g. motor load, of the machine, in particular without force peaks.

The blow-molding machine, as described above, may further comprise a fluid pressure accumulator.

The fluid pressure accumulator may be briefly designated hereinafter also as a fluid accumulator. The fluid pressure accumulator can for example be compared to a pressure spring which outputs its force upon gas compression/compression and is mechanically biased again during the return stroke of the piston. Owing to the blow-molding machine including a force equalization means with fluid accumulator, a more uniform drive load can be achieved, and an even greater compression is possible in the blow-molding machine. If necessary, the number of the pressure stages, e.g. the number of the pistons, can be reduced.

Furthermore, the above-described blow-molding machine may comprise a second pressure piston in a second pressure cylinder in its fluid pressure accumulator, wherein the second pressure cylinder can be filled at least partially with a fluid, for example a hydraulic liquid or compressed air.

Thus, the second pressure piston is moving in the second pressure cylinder, thereby tensioning or relaxing the fluid.

In the blow-molding machine, as described above, a compression force can be provided for the force equalization means via the fluid.

Hence, owing to the fluid in the fluid pressure accumulator, a force can be absorbed by means of the second pressure piston or again provided for the force equalization means. This is e.g. done by moving the second pressure piston in the second pressure cylinder.

Furthermore, the above-described blow-molding machine may comprise a wheel, such as a flywheel, in the force equalization means, wherein a connecting rod which absorbs the force of the pressure piston is attached to the wheel.

The force of the pressure piston, which piston is typically tensioned for stretch blow-molding the preform and which, after the preform has been inflated to its predetermined size, is relaxed again, can thus be delivered or discharged via the wheel. The design with the wheel offers the advantage that the cycle motion of the pressure piston can be translated into a circular motion of the wheel. The wheel of the force equalization means of the blow-molding machine, as described above, can further be connected to the fluid pressure accumulator. Owing to this connection the wheel can absorb the force of the pressure piston at the one side or, inversely, output force to the pressure piston, and further tension or relax the piston of the fluid pressure accumulator. It is understood that a drive may optionally be provided between the pressure piston and the force equalization means, e.g. the wheel.

Furthermore, the above-described blow-molding machine may comprise, in the force equalization means, an equalization container connected to the second pressure cylinder. The equalization container may be configured to receive the fluid from the second pressure cylinder at least partially.

Hence, the equalization container may typically be connected to the second pressure cylinder. The equalization container makes it possible to store the fluid when the second pressure piston is tensioned in the second pressure cylinder. Likewise, the fluid can flow out of the equalization container back into the second pressure cylinder, e.g. it may be sucked, when the second pressure piston is relaxed again. This offers the advantage that pressure energy can be stored by means of the fluid and the equalization container.

The fluid pressure cylinder within the equalization means of the blow-molding machine, as described above, may be configured as a water hydraulic system, wherein water is substantially used as the hydraulic liquid. This makes it also possible to provide a particularly simple hydraulic liquid which does not harm the system. However, it is also possible to use other liquids, or mixtures, such as an oil-water mixture, as a hydraulic liquid within the blow-molding machine as described above.

In the blow-molding machine, as described above, the pressure cylinder can be acted upon with pressure in the expanded state. It is thereby possible to control the size of the pressure cylinder, and the pressure cylinder need not be too large.

Further, a blow-molding machine, as described above, may include a second blow-molding unit which is connected to the force equalization means, wherein the second blow-molding unit may substantially have the properties as described above with reference to the first blow-molding unit.

At least a part of the compression force occurring can be used alternatingly in or by the first and the second blow-molding unit. In this way, excess compression force from the first blowing-molding unit can be used in the second blow-molding unit, and vice versa. This process can take place through the intermediary of pressure equalization, as described above, so that force peaks can particularly be avoided. This makes it possible to exactly coordinate two blow-molding units with one another and to ensure a particularly efficient operation owing to the coordination.

In the blow-molding machine, as described above, the force equalization means may comprise a passive and an active actuator, wherein the passive actuator may comprise a spring and/or a pneumatic cylinder and/or a hydraulic cylinder, and wherein the active actuator may comprise an electromechanical cylinder and/or a linear motor and/or a hydraulic cylinder, wherein the active actuator may be combined with a threaded spindle or a recirculating ball screw.

In this way, the force needed for blow molding in the blow-molding machine can be divided into two force components. Here, for example, the passive actuator can absorb most of the force. Thus, a smaller variable force proportion can typically be allocated to the active actuator. As a result, with a smaller power as compared with the undivided force, the active actuator can be used for compression, whereby energy can be saved.

The force equalization means as described above may comprise a toggle lever mechanism. In particular, the active and/or the passive actuator can be built into the toggle lever mechanism. Further, the force equalization means may comprise a scissor-type foldable joint. The active and/or passive actuator may here be incorporated into the scissor-type foldable joint. Here, the scissor-type foldable joint may also be connected to the toggle lever mechanism.

The disclosure also provides a method for blow molding containers, the method comprising the steps of: docking a preform to a blow-molding unit, which comprises a pressure piston and a pressure cylinder, stretch blow molding the preform into a finished container by means of compressed air, undocking the finished container, wherein at least part of the compression force is compensated by a force equalization means.

The above observations equally apply to the blow-molding unit used in the method with a force equalization means.

Thus, the blow-molding machine and the method, as described above, offer the advantages of a more uniform utilization of the piston drive and thus energy savings and also a possible smaller dimension of the piston drive. Force peaks can thereby be reduced or even avoided in the drive.

BRIEF DESCRIPTION OF THE DRAWINGS

The subject matter of the disclosure is illustrated by way of example with reference to the following drawings.

In the drawings.

DETAILED DESCRIPTION OF THE PREFERRED EMBODIMENT

FIGS. 1A to 1F show a blowing cycle, as for example occurs in a blow-molding machine for blow-molding plastic containers with at least one blow-molding unit.

Figure 1B:
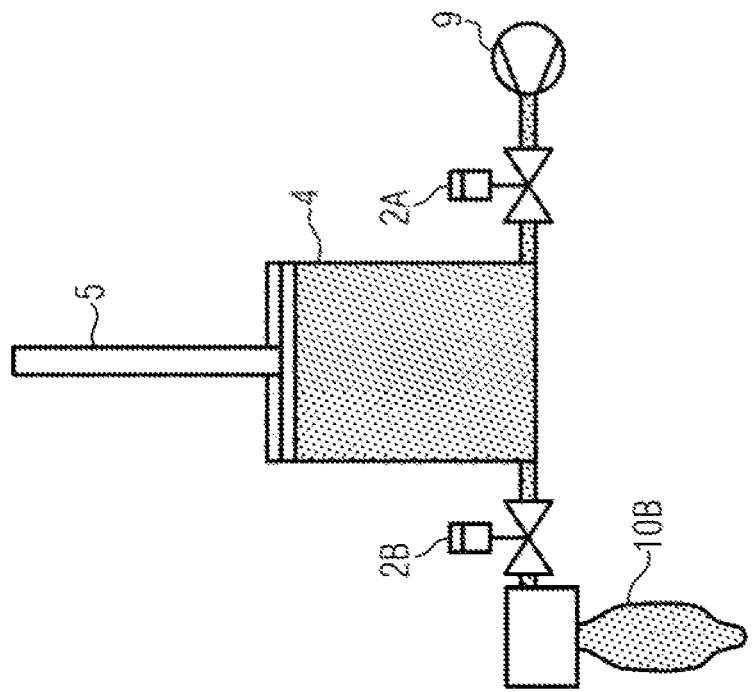
FIGS. 1A to 1F are schematic diagrams of a blowing cycle of a blow-molding machine for blow-molding preforms into a finished container.
Figure 1A:
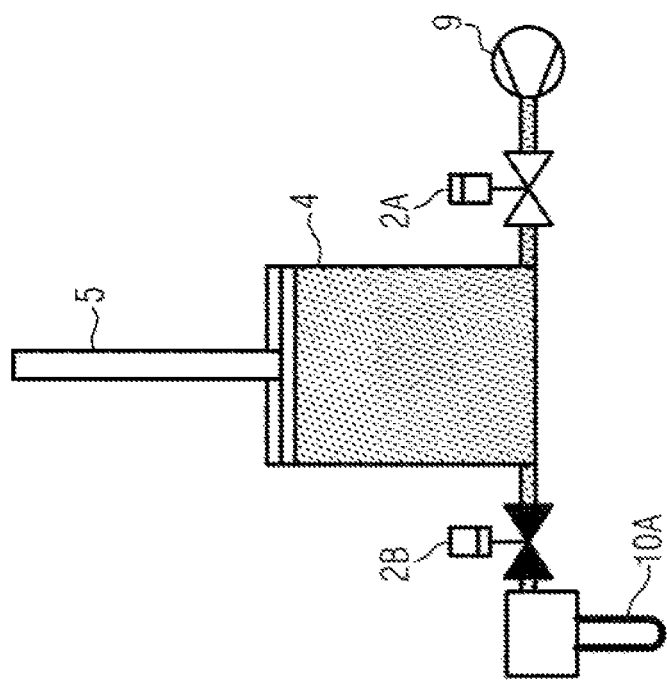

As shown in FIG. 1A, a preform 10A is docked to the blow-molding unit. The preform 10A may e.g. be made from PET or another suitable material. The illustrated blow-molding unit further comprises a pressure cylinder 4 in which a pressure piston 5 can be moved. Compressed air/pressurized air can be passed via a feed pump 9 into the pressure piston 5 in the relaxed state of the pressure piston 5. A valve 2A is located at the side of the feed pump 9. A valve 2B is located at the side of the docked preform 10A. The valve 2A can be opened and the pressure cylinder can be filled with pre-pressure. The pre-pressure may be about 4 to 12 bar.

FIG. 1B shows the next step. In the next step, the valve 2B is opened and the preform 10A is inflated by the pre-pressure prevailing in the pressure cylinder to form the pre-blow bottle 10B.

FIGS. 1A to 1F do not show any pre-blow molds for molding the preforms 10A to be blow-molded. The units shown in these figures are pre-blow bottles.

Figure 1D:
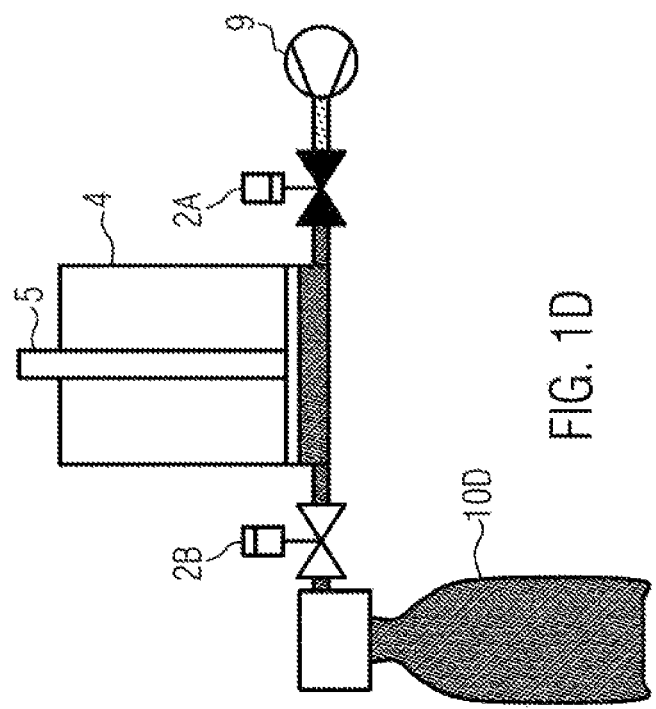
Figure 1C:
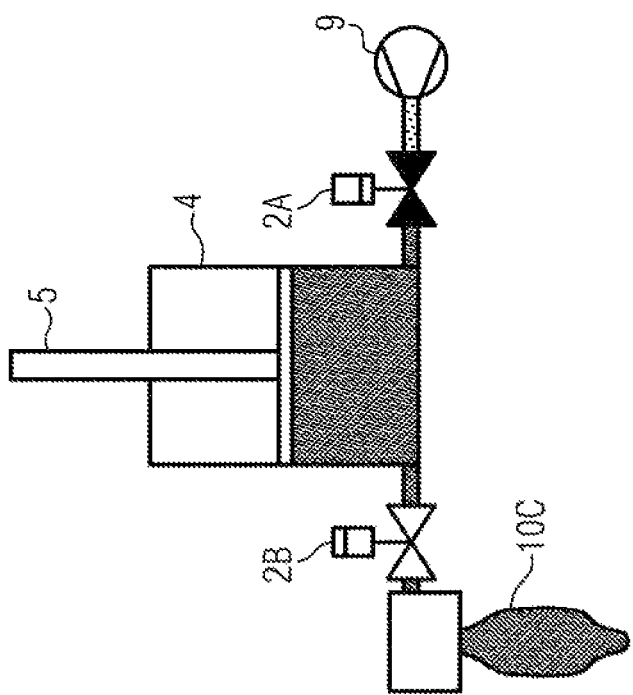

FIG. 1C shows the next step of the blowing cycle. The valve 2A is closed, so that no further pressure is filled by the feed pump into the pressure cylinder 4 anymore. The piston of the pressure cylinder 4 is tensioned, whereby the pressure in the system is increased. Accordingly, since the valve 2B is opened, the pressure in the pre-blow bottle 10B is further increased, so that it expands to form the pre-blow bottle 10C.

FIG. 1D shows that the pressure cylinder 4 with pressure piston 5 is virtually fully tensioned. As a result, the pre-blow bottle is now inflated into a bottle with final blowing pressure. This bottle with final blowing pressure is designated by reference numeral 10D.

Figure 1F:
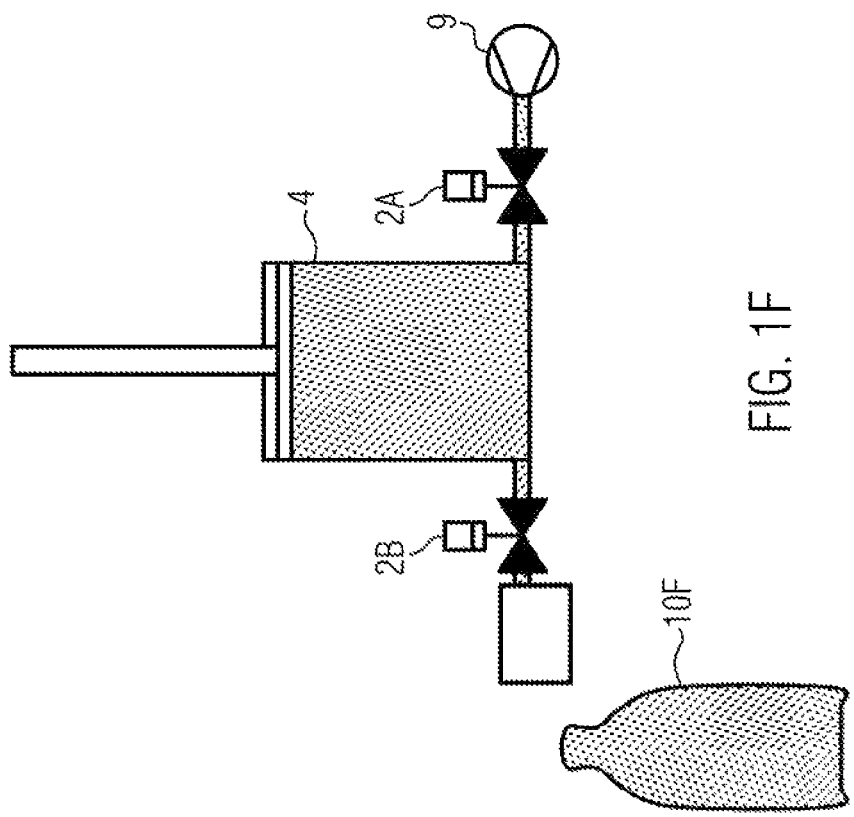
Figure 1E:
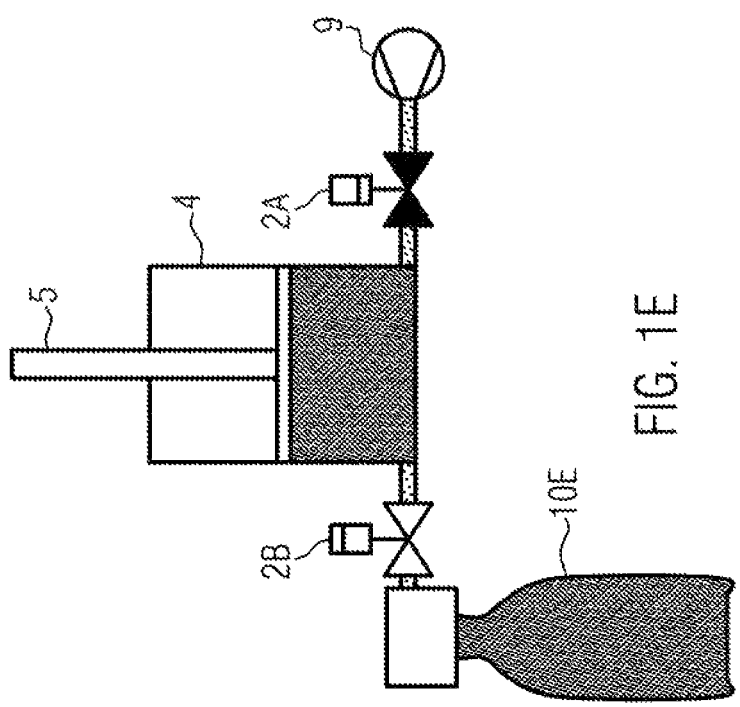

FIG. 1E shows that a portion of the pressure from bottle 10D is returned into the mechanical system of the pressure cylinder 4 and the pressure piston 5. A portion of the excess pressure in the bottle is thus returned to the system.

In FIG. 1F, the valve 2B is closed. The pressure piston 5 has again reached its initial position in the pressure cylinder 4. The finished bottle 10F is undocked from the blow-molding unit and can be transferred to other production stages.

Figure 2:
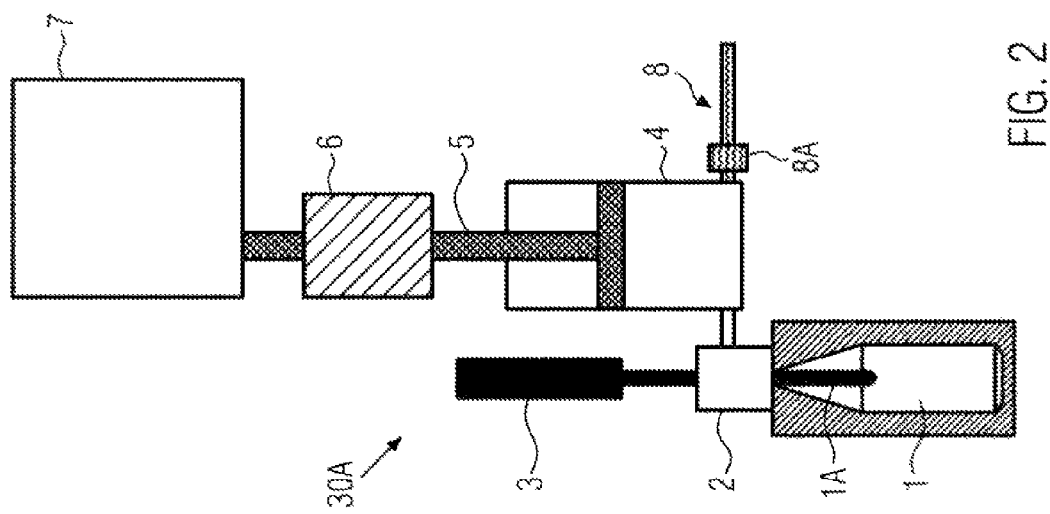
FIG. 2 is a sketch of a blow-molding unit according to the disclosure with a force equalization means.

On a blow-molding unit 30A, FIG. 2 shows a preform 1A in a blow mold 1. The blow mold 1 is held by a holder (not shown) with a valve 2. A stretching unit 3 is located above the valve 2. The stretching unit 3 with the valve 2 and the holder with the preform 1A are connected to a pressure cylinder 4 with pressure piston 5. Pressure cylinder 4 and pressure piston 5 may here correspond to the pressure cylinder 4 and the pressure piston 5 of FIGS. 1A to 1F. Furthermore, the pressure cylinder 4 of the blow-molding unit 30A has a low-pressure air line 8. The low-pressure air line 8 includes a valve 8A. The valves 2 and 8A can correspond in their function to the valves 2A and 2B of FIGS. 1A to 1F. FIG. 2 further shows a drive 6 for the pressure cylinder 4 with pressure piston 5. The drive 6 may here be a suitable motor drive, which is able to exert a force on the pressure piston 5 in pressure cylinder 4, i.e., to tension the pressure piston 5 in the pressure cylinder 4 or to relax again the pressure piston 5 in the pressure cylinder 4. The drive 6 is further connected to a force equalization means 7, which is capable of absorbing and equalizing, respectively, a compression force, which is absorbed via the pressure piston 5.

Figure 3:
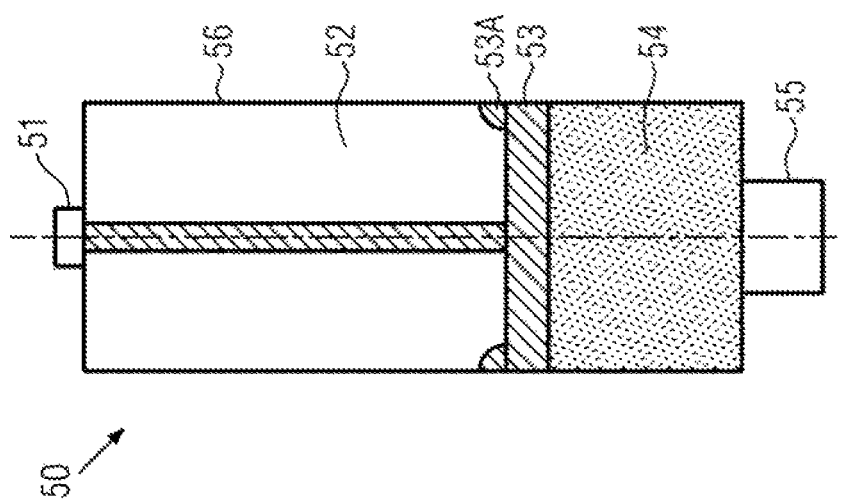
FIG. 3 is a sketch of a fluid pressure accumulator according to the disclosure.

FIG. 3 shows a fluid pressure accumulator 50. Said accumulator is configured by way of example as a hydraulic pressure accumulator. Said hydraulic pressure accumulator 50 may be contained in the force equalization means 7. Further, it is possible that the hydraulic accumulator 50 is separately connected to the force equalization means 7. The hydraulic pressure accumulator 50, as shown in FIG. 3, comprises a filling valve 51 for a filling gas such as nitrogen. A nitrogen gas filling 52 forms a gas beam 52. The gas beam 52, such as nitrogen gas, can move the hydraulic pressure piston 53, which additionally comprises seals 53A, within the hydraulic pressure accumulator 50. The hydraulic pressure piston 53 works against a hydraulic liquid 54, which is shown in FIG. 3 in the lower part. The hydraulic pressure accumulator 50 has a hydraulic connection 55. A force can be transmitted via the hydraulic side of the hydraulic pressure accumulator 50 with hydraulic pressure cylinder 56. The pressure is provided via the nitrogen beam 52.

Figure 4:
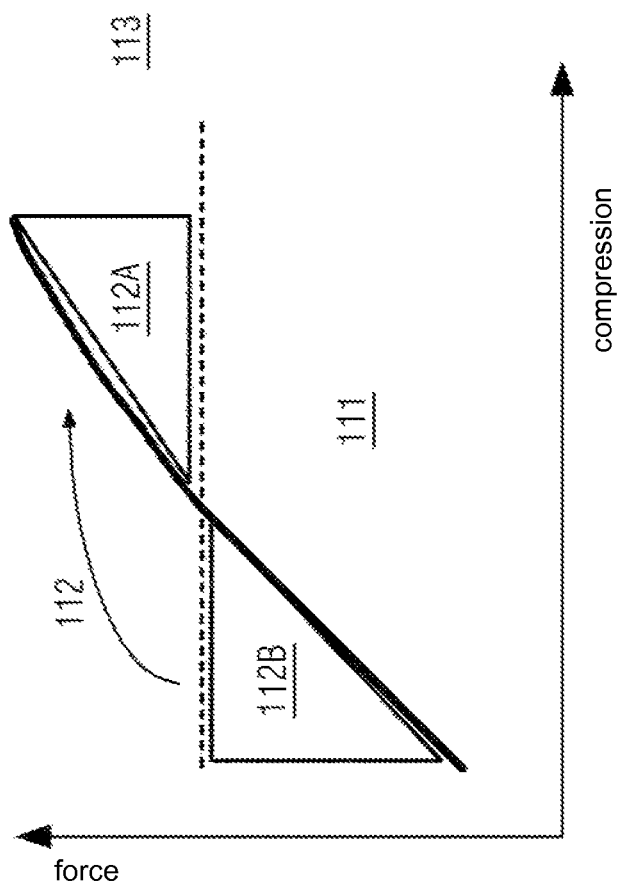
FIG. 4 is a sketch of the force compensation as a function of the compression according to the disclosure.

FIG. 4 shows by way of example the force applied with respect to the compression for the normal case 111 for the development as shown in FIG. 3. With the force equalization according to the hydraulic pressure accumulator 50, as described in FIG. 3, the fields 112a and 112b can be equalized according to the force equalization indicated by reference numeral 112. The resulting force is typically a force that represents a uniform drive load and includes far fewer or no force peaks. Curve 111, for example, encompasses many cycles. Without compensation, great force variations, i.e. force peaks, would occur. Thus, curve 111 would be, for example, strongly serrated. Through the force compensation, the force peaks can be significantly smoothed, as shown by way of example by curve 113, and a uniform force can be provided as a function of the compression.

Figure 5A:
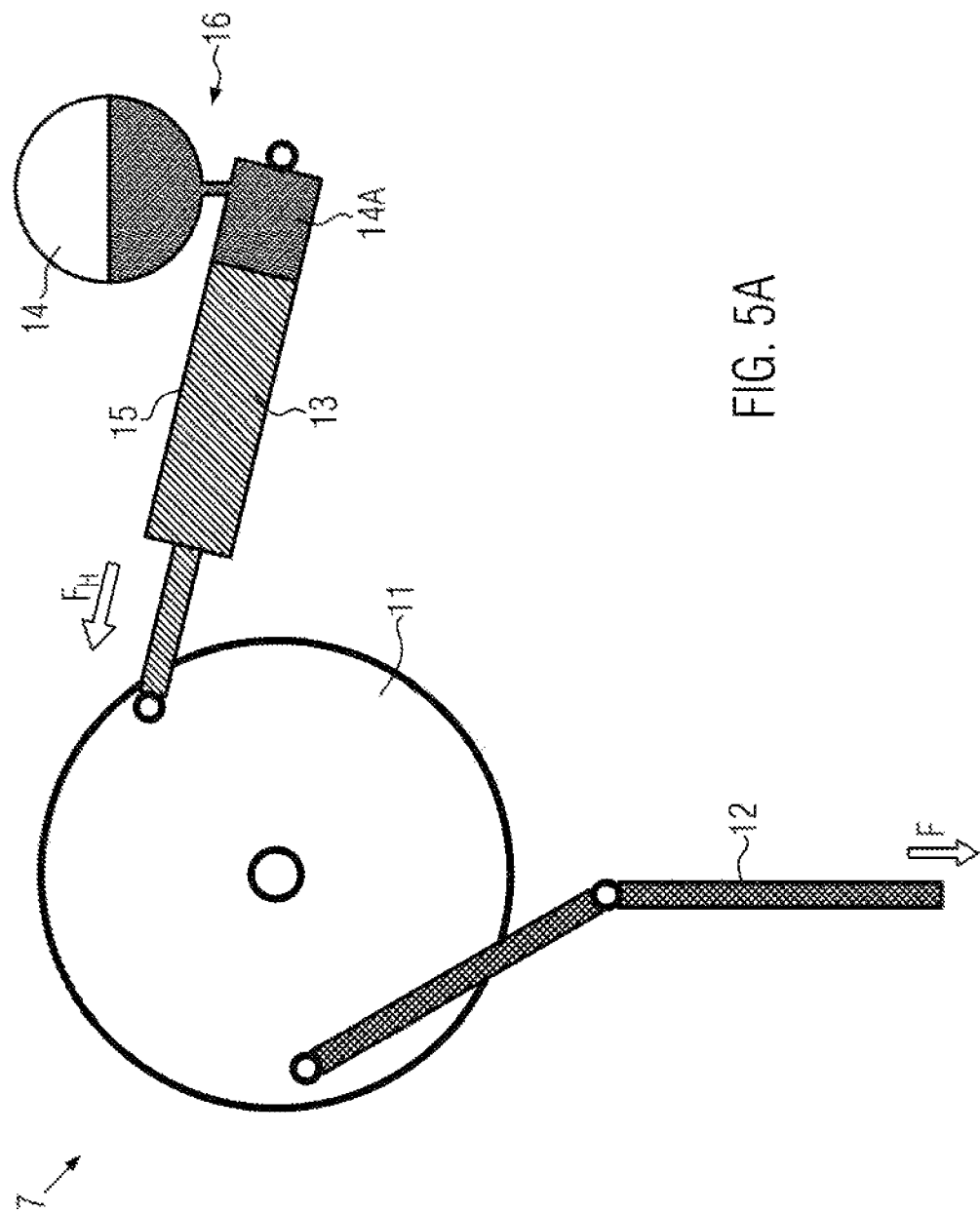
FIG. 5A is a sketch of a further development of the force equalization means with fluid pressure accumulator according to the disclosure.
Figure 5B:
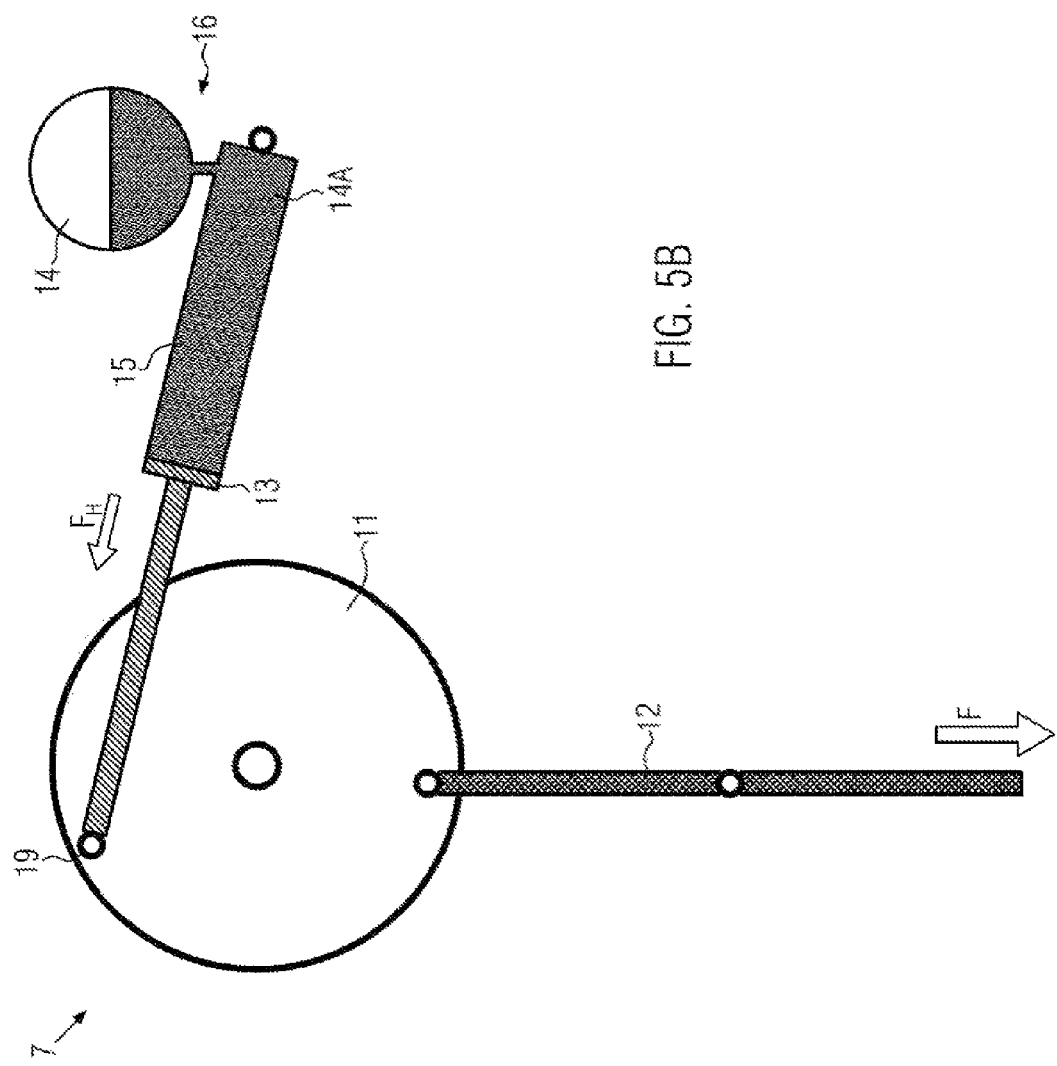
FIG. 5B is a sketch of the force equalization means with fluid pressure accumulator in a relaxed state of the fluid pressure accumulator.

FIGS. 5A and 5B show a further development of the force equalization means 7 with a fluid pressure accumulator 16. FIGS. 5A and 5B show different compression, i.e. tension, phases, of a pressure cylinder 15, which is referred to as the second pressure cylinder, and of the fluid pressure accumulator 16. In FIGS. 5A and 5B, the fluid pressure accumulator is designed for example as a hydraulic pressure accumulator. The fluid pressure accumulator 16 can for example be filled at least in part with a hydraulic liquid as the fluid. However, it is also possible to fill the fluid pressure accumulator 16 with a different fluid, for example with compressed air.

FIG. 5A shows a wheel 11 which may be for example a flywheel. Said wheel 11 can be connected via a connecting rod 12 to the blow-molding unit, as outlined in FIG. 2. That is, the connecting rod 12 may be suitably connected to the drive 6 to be able to deliver a force to the pressure cylinder 4 with its pressure piston 5 via the drive 6. The connecting rod 12 may be configured in one part or in multiple parts. In FIGS. 5A and 5B, the connecting rod 12 is, for example, outlined in two parts. The connecting rod 12 is typically mounted near the circumference of the wheel 11. The attachment of the connecting rod 12, or at least of the first element of the connecting rod 12, is configured to be for example mobile. Further, the wheel 11 is connected to the fluid pressure accumulator 16. The fluid pressure accumulator 16 includes the pressure piston 13 which is referred to as the second pressure piston. The second pressure piston 13 can move in the second pressure cylinder 15. For example, the second pressure cylinder 15 may be a hydraulic pressure cylinder. It is also possible (not shown) that the second pressure cylinder 15 comprises a pneumatic pressure cylinder. The direction of force of the second pressure piston 13 within the second pressure cylinder 15 is outlined by way of example by an arrow with the letter FH. The direction of force indicated by the arrow FH in FIG. 5A is relevant, for example, to the relaxation of the second pressure cylinder 15. Accordingly, the opposite direction with respect to the arrow FH is of relevance to the tensioning of the second pressure cylinder 15. The second pressure cylinder 15 further includes a fluid, such as a hydraulic liquid 14a. The hydraulic liquid 14a can be compressed by the second pressure piston 13 within the second pressure cylinder 15 of the fluid pressure accumulator 16. Further, the second pressure cylinder 15 is connected to an equalization container 14. The equalization container 14 is e.g. configured to take the fluid, i.e. for example the hydraulic liquid 14A, from the second pressure cylinder 15 during tensioning of the second pressure cylinder 15.

FIG. 5B shows the development of FIG. 5A in the state where the fluid pressure cylinder 15 has taken a maximum amount of fluid, i.e. for example hydraulic liquid 14a, from the equalization container 14.

The second pressure piston 13 is here virtually retracted to the maximum degree, i.e. the second pressure piston 13 is in its end position with respect to the second pressure cylinder 15. At the same time the greatest force possible is delivered in the direction of the blow-molding unit (here not shown), as outlined by the vertical arrow F.

Hence, according to the state shown in FIG. 5B substantially the greatest force possible is delivered from the pressure equalization means 7 to the blow-molding unit (here not shown). To this end the connecting rod 12 is substantially stretched. The connecting rod 12 may also be a multipart rod. In the case of a multipart connecting rod 12, all parts of the connecting rod 12 substantially form a straight line. The second pressure piston 13 is movably attached to the wheel 11 at the side facing away from the second pressure cylinder 15. The second pressure piston 13 is also attached close to the circumference of the wheel 11. This attachment is similar to the attachment of the connecting rod 12, but may typically also be provided at a point distinctly away from the attachment of the connecting rod 12 near the circumference of the wheel 11.

Furthermore, the fluid pressure accumulator 16 has a further suspension 19. As outlined in FIG. 5B, the suspension 19 may e.g. be provided at the closed side of the second pressure cylinder 15. With the help of the suspension 19, the fluid pressure cylinder 16 can follow the movement of the wheel 11 in a suitable way. It is understood that further movable suspensions of the elements outlined in FIGS. 5A and 5B are possible.

Figure 6:
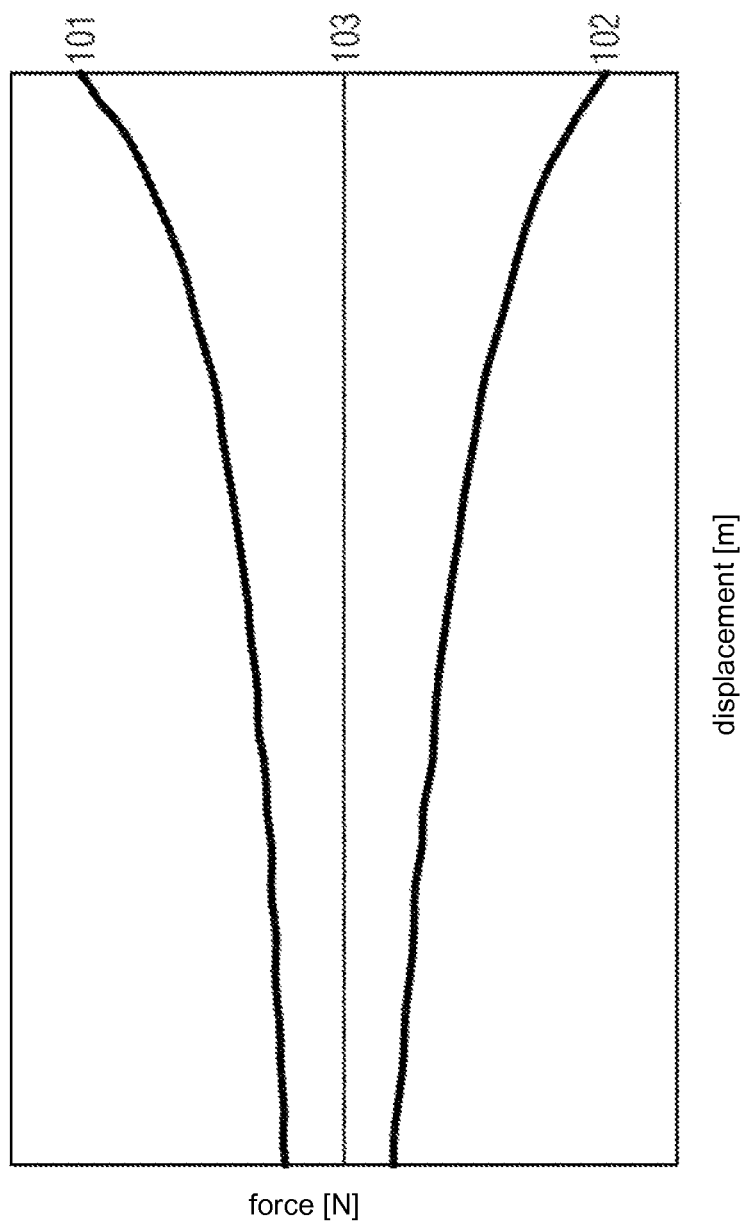
FIG. 6 is a sketch of the resulting force as a function of the displacement of the pressure cylinder according to the embodiment of FIGS. 5A and 5B.

FIG. 6 shows an example of the force as a function of the displacement according to the development of FIGS. 5, 5A and 5B.

The curve 101 of FIG. 6 shows by way of example the uncompensated force in the pressure cylinder 4. The curve 102 shows by way of example the force provided by the force equalization means 7. It is important to note in the illustration in FIG. 6 that the ordinate outlined there bears a double-headed arrow and the zero point is located approximately in the middle of the ordinate.

The pressure equalization means 7 according to curve 102 compensates for the compression force of the pressure cylinder 101. The resulting force, i.e. the sum of the forces in accordance with curves 101 and 102, is exemplified by the curve 103. By appropriate choice of the arrangement of connecting rod 12, wheel 11, pressure piston 5 and fluid pressure accumulator 16, the resulting force, as exemplarily outlined in FIG. 6 may, for example, be kept below 2% of the maximum force of the pressure piston 5. The maximum force of the pressure piston 5 is shown by way of example in FIG. 6 by the maximum of the curve 101 at the right edge of the graph. Accordingly, the drive of the configuration of FIGS. 4 to 6 need no longer be designed for a force of 40 kN, for example, but it would suffice, for example, a force of only about 1 kN.

Figure 7:
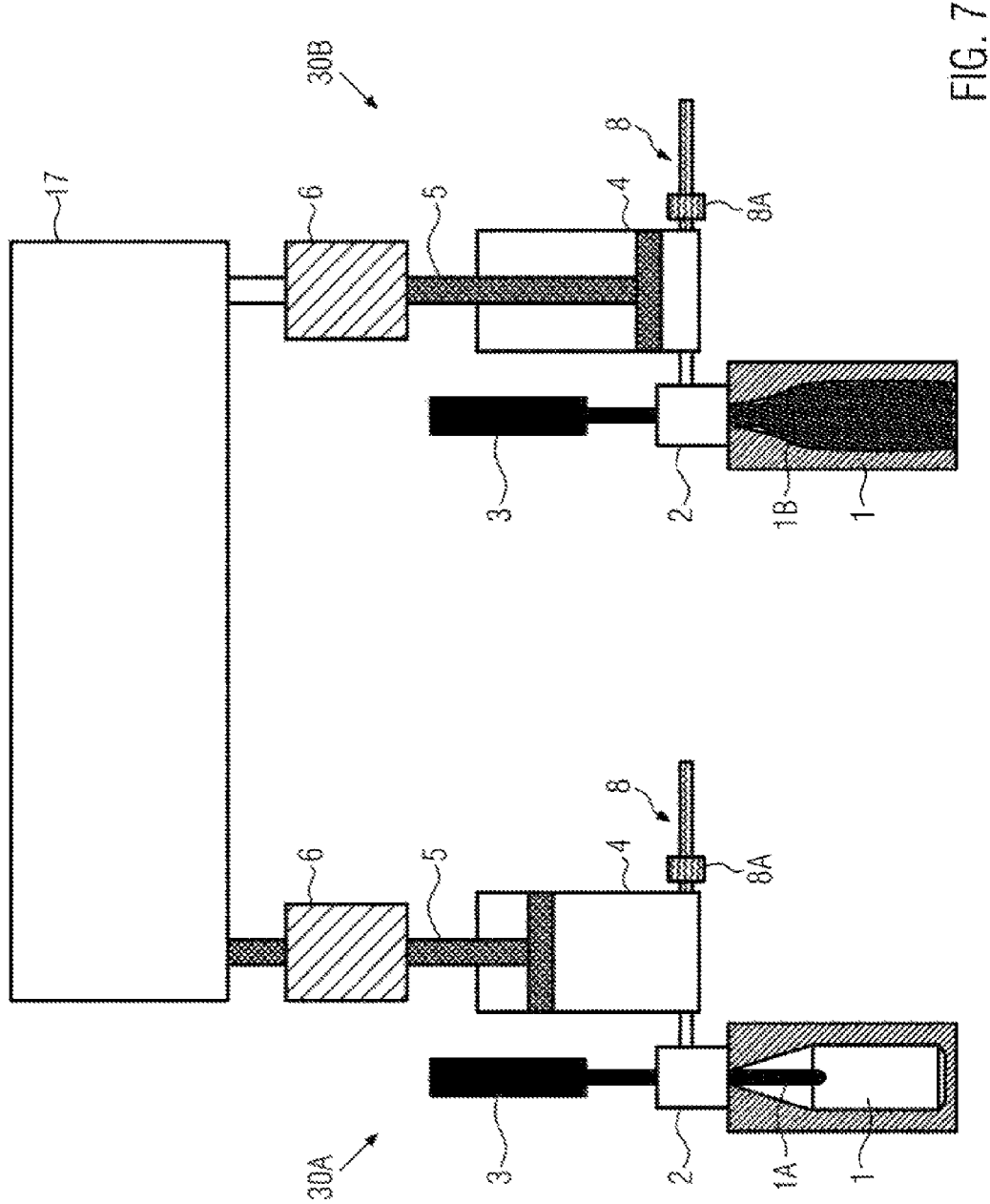
FIG. 7 is a sketch of a blow-molding machine for blow-molding plastic containers with two blow-molding units according to a development of the disclosure.

FIG. 7 shows a further development of the blow-molding machine with a second blow-molding unit 30B in addition to the first blow-molding unit 30A. The blow-molding units 30A and 30B are connected to a force equalization means 17. The force equalization means 17 may be configured to be similar to the force equalization means 7, which has already been described above. The blow-molding units 30A and 30B may be substantially identical. FIG. 7 shows that in the blow-molding unit 30A a preform 1A has not been blow-molded yet. By contrast, a finished bottle 1B has been blow-molded in the blow mold 1 in unit 30B. The pressure piston 5 of the pressure cylinder 4 of the unit 30B is essentially fully tensioned here. Part of the compression force released in the one unit, here 30A, can be provided via the drive 6 of the unit 30A and the corresponding drive 6 of the other unit 30B, and vice versa. The force equalization means 17 ensures a further smoothing of the force which can be provided alternatingly between the two blow-molding units 30A and 30B. It would also be conceivable that the two blow-molding units 30A and 30B are connected to a pressure connection, for example a pipe, but each of the units 30A and 30B has its own force equalization means (here not shown).

Figure 8A:
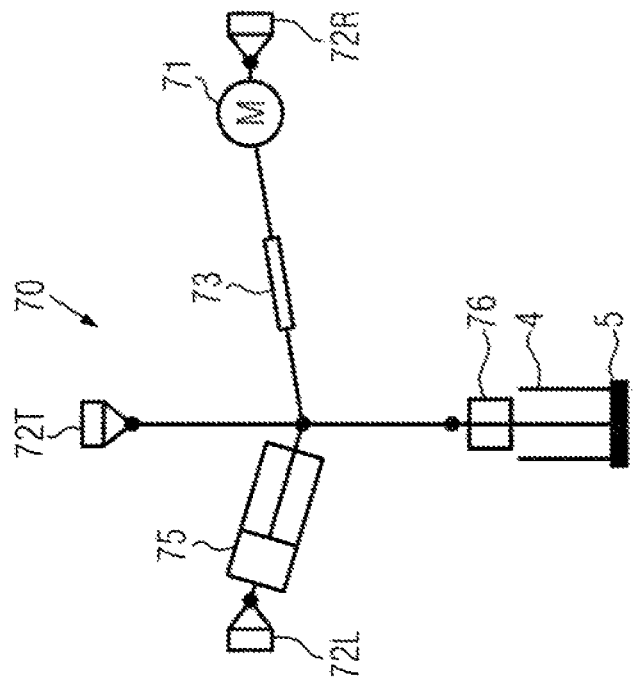
FIGS. 8A and 8B are sketches of a further development of the force equalization means with a passive and an active actuator with a lever mechanism, wherein various compression stages are shown.
Figure 8B:
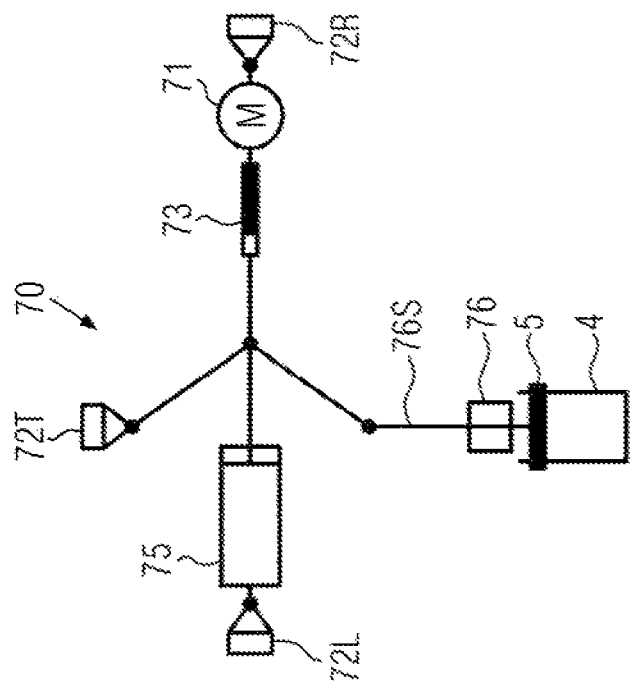

FIGS. 8A and 8B show a further development of the blow-molding machine. As already indicated in FIGS. 4 and 6, the increase in force during compression and blow molding in the case of a direct drive is very great. This means that at the end of the compression process a very great force would have to be applied, which would require a very large drive.

The total force, which is shown in FIGS. 4 and 6, can be divided into two force components. The division is such that a proportion which is as great as possible corresponds to a force curve of a passive actuator and only a small variable force proportion must be applied by a drive. The major proportion of the total force can be applied by means of a passive actuator, for example a spring and/or a pneumatic cylinder and/or a hydraulic cylinder. It is understood that these elements can also be used in any combination as a passive actuator. To this end, just one drive with lower power is needed as an active actuator for compression.

FIG. 8A shows a toggle lever mechanism 70 with which the force on the pressure cylinder 4 can be deflected uniformly for the drive mechanism 70, as shown for example in FIG. 4. The greater portion of the drive force is applied by a passive actuator such as a hydraulic cylinder/pneumatic cylinder 75 or a spring. The remaining variable proportion can be realized by means of an active actuator, for example an electromechanical cylinder, a drive M in the form of a rotary motor or servo motor 71, or by a further hydraulic cylinder. For the active actuator the drive M may be combined with a threaded spindle or a recirculating ball screw 73. Reference numeral 73 designates a threaded spindle or recirculating ball screw with associated (movement) thread.

FIG. 8A shows supports/attachments 72L, 72R and 72T. In this case, the pneumatic cylinder/hydraulic cylinder 75, the threaded spindle 73 and a rotary motor or servo motor 71 are attached between the supports 72L and 72R. FIG. 8A also shows, by the reference numeral 76, a slide bearing. The slide bearing is used for guiding a rod 76S. The toggle lever mechanism 70 is shown in FIG. 8A in the start position where the pneumatic piston/hydraulic piston of the pneumatic cylinder/hydraulic cylinder is pushed out completely.

FIG. 8B shows the same elements as in FIG. 8A. In this case, however, the toggle lever mechanism 70 is shown in the position in which in the pressure cylinder 4 the piston 5 is pushed downwards to the maximum degree, i.e. the highest pressure is generated for blow molding.

Figure 9B:
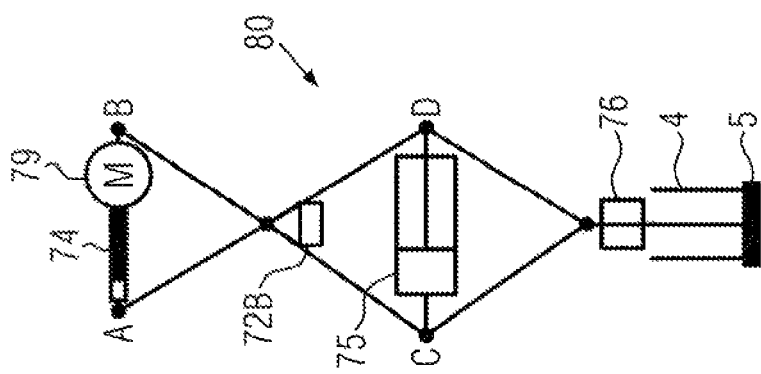
FIGS. 9A and 9B are sketches of a further development of the force equalization means with a passive and an active actuator and a lever mechanism, wherein various compression stages are shown.
Figure 9A:
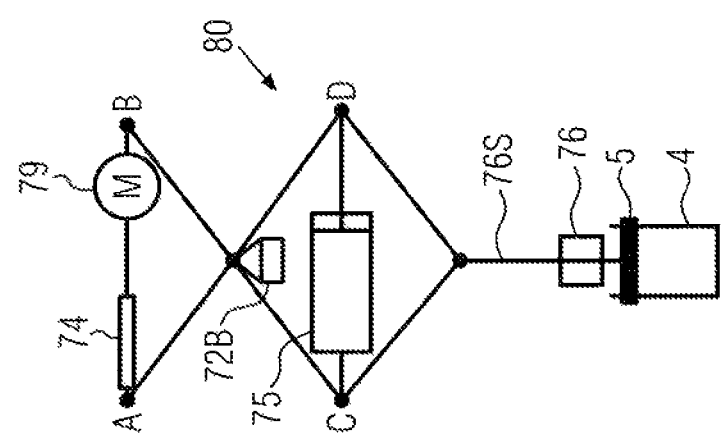

FIG. 9A shows a further development of the drive mechanism 70, as has already been discussed on the basis of FIGS. 8A and 8B. The mechanism 80 shown in FIG. 9A is characterized in that smaller supporting forces are introduced into the surrounding housing. The hydraulic/pneumatic cylinder 75 and the actuator for the drive are here positioned between a scissor-type foldable joint 80. The passive actuator in the form of the pneumatic cylinder or hydraulic cylinder 75 is located between points C and D of the scissor-type foldable joint 80. The active actuator is located between points A and B of the scissor-type foldable joint 80. The drive M may be realized in the form of a further hydraulic cylinder/pneumatic cylinder 79 or in the form of a motor, for example a linear motor. Reference numeral 74 denotes a threaded spindle or recirculating ball screw which can be combined with drive M.

As already explained with reference to FIGS. 8A and 8B, the elements that form the passive actuator, here pneumatic cylinder/hydraulic cylinder 75 or a spring on the one side and the elements forming the active actuator, i.e., the drive here as rotary or servo motor 71, or as a linear motor or a hydraulic/pneumatic cylinder 79, can be chosen and combined. In particular, these elements may also be integrated in the same actuator element. FIG. 9A shows the toggle lever mechanism 80 in the start position, in which the pneumatic piston/hydraulic piston of the pneumatic cylinder/hydraulic cylinder 75 is pushed out completely. The piston 5 in the pressure cylinder 4 is preloaded. FIG. 9B shows the mechanism 80 in the position where the piston 5 in the pressure cylinder 4 is pushed down completely, that is the maximum blow-molding pressure is generated for blow molding. The plunger of the pneumatic piston/hydraulic piston 75 is here pushed in to the maximum degree.

The principle of the examples shown in FIGS. 8A, 8B, 9A and 9B is as follows. Reference numerals 71 and 73 and 79 and 74, respectively, depict a drive which is configured to control the movement of the piston 4 more or less alone. Without force compensation a very great force (power) would be needed for compression, depending on the compression of the blow air in the cylinder 4. This would be dependent on the position of the piston 5. By using a toggle lever, cf. FIGS. 8A and 8B, the maximum force required can be reduced, since under the lever principles the transmittable torque at the time of the greatest compression is greatest. If the toggle lever is positioned at a very great angle, only small torques (forces) can be transmitted under the lever principles. However, these are then also not needed because less compression is required from the piston 5 at this time.

The additional measure of using a piston 75, see FIGS. 8A and 8B, can reduce the force from the drive M once again in its entirety. The piston 75 is acted upon in this embodiment at its right side with a constant pressure, for example through a connection to a large pressure air tank. The left side is pressureless, i.e., it is connected to the atmosphere. As a result, a force acts on the piston 5 virtually constantly. Most of the time, a further force is acting on the piston 5 in addition and permanently from below due to the compressed blow air. This induces a force equalization between the piston 75 and the piston 5, in the ideal case (in almost all operating states) even a complete force equalization, so that the drive 71 and 79, respectively, only has to perform the movement, but this with very little power.

Only for the case that a bottle bursts, a further aspect must be heeded because in such a case the operating condition as described above cannot be maintained. For this case compressed air can flow out of the cylinder 4 downwards to the blow mold. In this case, a valve is to be switched, which vents the right side of the piston 75, and particularly a further valve which prevents the supply of compressed air from the tank.

The passive actuator may also be a spring, which, however, would provide a non-uniform force. A weight would also be expedient as a substitute for the piston 75, but here the magnitude of the weight in relation to the size of the device would have to be observed.

Figure 10A:
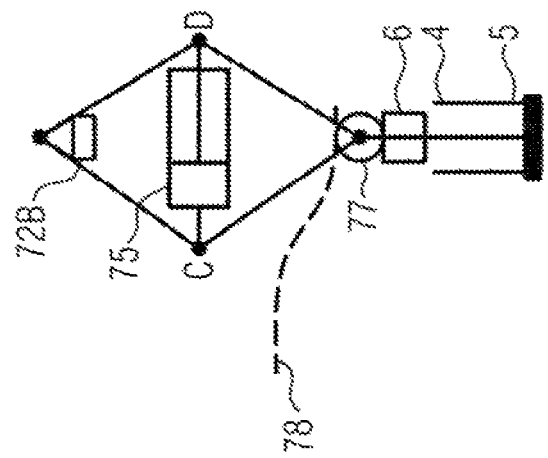
FIGS. 10A and 10B are sketches of a further development of the force equalization means with a passive and an active actuator and a lever mechanism, wherein various compression stages are shown.
Figure 10B:
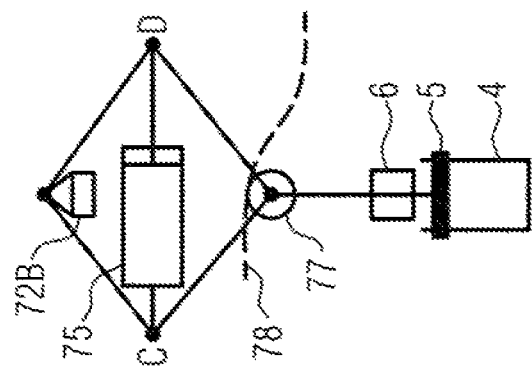

FIGS. 10A and 10B show a further development with respect to the variants as shown in FIGS. 8A, 8B and 9A and 9B. In the mechanism 90 shown in FIGS. 9A and 9B, the active part of the actuator is each time implemented with a cam roller 77 and a cam track 78. This embodiment is advantageous if the mechanism 90 is used in a rotary machine. FIG. 10A again shows the state in which the pneumatic piston/hydraulic piston 75 is pushed out completely, while the piston 5 in the pressure cylinder 4 is preloaded. FIG. 10B shows the state in which the piston 5 in the pressure cylinder 4 is pushed down completely, i.e. the maximum blow pressure is generated. The plunger of the pneumatic piston/hydraulic piston 75 is pushed in to the maximum degree. In FIG. 10B, the cam roller 77 following the cam track 78 has reached its lowest point.

In the systems shown above in the various embodiments, it must be ensured that valves of the blow-molding units have an emergency stop particularly in the start phase. This emergency stop must ensure that the pressure can be discharged out of the system by opening the valves, if necessary, in particular when, for example, a pressure piston in a pressure cylinder cannot move away.

It is understood that features mentioned in the above-described embodiments are not restricted to the combinations specifically shown in the figures, but may also be combined in any desired way.

What is claimed is:

1. A method for blow-molding containers, comprising:
    docking a preform to a blow-molding unit, which comprises a pressure piston and a pressure cylinder;
    stretch blow-molding the preform to form a finished container by means of compressed air;
    undocking the finished container;
    compensating at least part of the compression force by a force equalization means;
    wherein the force equalization means comprises one of a passive actuator, an active actuator, and a combination thereof;
    wherein the passive actuator comprises one of a spring, a pneumatic cylinder, a hydraulic cylinder, and a combination thereof;
    wherein the active actuator comprises one of an electromechanical cylinder, a linear motor, a hydraulic cylinder, pneumatic cylinder, and a combination thereof;
    wherein the active actuator is adapted to be combined with a threaded spindle or a recirculating ball screw; and
    wherein the force equalization means comprises a scissor-type foldable joint.

2. A blow-molding machine for blow-molding plastic containers, the blow-molding machine comprising: at least one blow-molding unit for stretch blow-molding preforms by means of compressed air, the blow-molding unit having a force equalization means, such that at least part of the compression force arising is compensated; a pressure piston and a pressure cylinder; and wherein the force equalization means comprises a fluid pressure accumulator; wherein the fluid pressure accumulator comprises a second pressure piston in a second pressure cylinder, wherein the second pressure cylinder is filled at least partially with a fluid; and wherein the second pressure cylinder is configured as a water hydraulic system, wherein water is substantially used as hydraulic liquid.

3. The blow-molding machine according to claim 2, wherein a compression force is provided for the force equalization means through the fluid.

4. The blow-molding machine according to claim 2, wherein the second pressure piston is acted upon by pressure from a gas beam.

5. The blow-molding machine according to claim 4, wherein the gas beam comprises nitrogen.

6. The blow-molding machine according to claim 2, wherein the fluid is a hydraulic liquid or compressed air.

7. The blow-molding machine according to claim 2, wherein the pressure cylinder in an expanded state is acted upon by pressure.

8. The blow-molding machine according to claim 2, and comprising a second blow-molding unit which is connected to the pressure equalization means, wherein at least part of the compression force arising is alternatingly used in the first and in the second blow-molding unit.

9. A blow-molding machine for blow-molding plastic containers, the blow-molding machine comprising: at least one blow-molding unit for stretch blow-molding preforms by means of compressed air, the blow-molding unit having a force equalization means, such that at least part of the compression force arising is compensated; a pressure piston and a pressure cylinder; wherein the force equalization means comprises a fluid pressure accumulator and a wheel; and wherein a connecting rod which absorbs the force of the pressure piston is attached to the wheel.

10. The blow-molding machine according to claim 9, wherein the wheel is connected to the fluid pressure accumulator.

11. The blow-molding machine according to claim 9, wherein the wheel is a flywheel.

12. A blow-molding machine for blow-molding plastic containers, the blow-molding machine comprising: at least one blow-molding unit for stretch blow-molding preforms by means of compressed air, the blow-molding unit having a force equalization means, such that at least part of the compression force arising is compensated; a pressure piston and a pressure cylinder; wherein the force equalization means comprises one of a passive actuator, an active actuator, and a combination thereof; wherein the passive actuator comprises one of a spring, a pneumatic cylinder, a hydraulic cylinder, and a combination thereof; wherein the active actuator comprises one of an electromechanical cylinder, a linear motor, a hydraulic cylinder, a pneumatic cylinder, and a combination thereof; wherein the active actuator is adapted to be combined with one of a threaded spindle or a recirculating ball screw; and wherein the force equalization means comprises a toggle lever mechanism.

13. The blow-molding machine according to claim 12, wherein the force equalization means further comprises a scissor-type foldable joint.

14. A blow-molding machine for blow-molding plastic containers, the blow-molding machine comprising: at least one blow-molding unit for stretch blow-molding preforms by means of compressed air, the blow-molding unit having a force equalization means, such that at least part of the compression force arising is compensated; a pressure piston and a pressure cylinder; wherein the force equalization means comprises one of a passive actuator, an active actuator, and a combination thereof; wherein the passive actuator comprises one of a spring, a pneumatic cylinder, a hydraulic cylinder, and a combination thereof; wherein the active actuator comprises one of an electromechanical cylinder, a linear motor, a hydraulic cylinder, a pneumatic cylinder, and a combination thereof; wherein the active actuator is adapted to be combined with one of a threaded spindle or a recirculating ball screw; and wherein the force equalization means further comprises a scissor-type foldable joint.

15. A method for blow-molding containers, the method comprising:
docking a preform to a blow-molding unit, which comprises a pressure piston and a pressure cylinder;
stretch blow-molding the preform to form a finished container by means of compressed air;
undocking the finished container;
compensating at least part of the compression force by a force equalization means; and wherein the force equalization means comprises a fluid pressure accumulator; and
wherein the second pressure cylinder is configured as a water hydraulic system, wherein water is substantially used as the hydraulic liquid.

16. The method according to claim 15, wherein the fluid pressure accumulator comprises a second pressure piston in a second pressure cylinder, wherein the second pressure cylinder is at least partially filled with a fluid.

17. The method according to claim 16, wherein a compression force is provided for the force equalization means via the fluid.

18. The method according to claim 16, wherein the second pressure piston is acted upon by pressure from a gas beam.

19. The method according to claim 16, wherein the gas beam is nitrogen.

20. The method according to claim 16, wherein the fluid is a hydraulic fluid or compressed air.

21. The method according to claim 15, further comprising applying pressure to the pressure cylinder in an expanded state.

22. The method according to claim 15, wherein a first blow molding unit and a second blow-molding unit are connected to the force equalization means, each of the first and second blow-molding unit having a force equalization means, such that at least part of the compression force arising is compensated, and a pressure piston and a pressure cylinder, wherein the force equalization means comprises one of a passive actuator, an active actuator, and a combination thereof, wherein the passive actuator comprises one of a spring, a pneumatic cylinder, a hydraulic cylinder, and a combination thereof, and wherein the active actuator comprises an electromechanical cylinder, a linear motor, a hydraulic cylinder, a pneumatic cylinder, and a combination thereof, and wherein the active actuator is adapted to be combined with one of a threaded spindle or a recirculating ball screw, wherein the force equalization means further comprises a scissor-type foldable joint, wherein the method further comprises alternatingly using at least part of the arising compression force in the first and in the second blow-molding unit.

23. A method for blow-molding containers, the method comprising:
docking a preform to a blow-molding unit, which comprises a pressure piston and a pressure cylinder;
stretch blow-molding the preform to form a finished container by means of compressed air;
undocking the finished container;
compensating at least part of the compression force by a force equalization means;
wherein the force equalization means comprises a fluid pressure accumulator;
wherein the force equalization means comprises a wheel; and
wherein a connecting rod which absorbs the force of the pressure piston is attached to the wheel.

24. The method according to claim 23, wherein the wheel is connected to the fluid pressure accumulator.

25. The method according to claim 23, wherein the wheel is a flywheel.

26. A method for blow-molding containers, comprising:
docking a preform to a blow-molding unit, which comprises a pressure piston and a pressure cylinder;
stretch blow-molding the preform to form a finished container by means of compressed air;
undocking the finished container;

compensating at least part of the compression force by a force equalization means;

wherein the force equalization means comprises one of a passive actuator, an active actuator, and a combination thereof;

wherein the passive actuator comprises one of a spring, a pneumatic cylinder, a hydraulic cylinder, and a combination thereof;

wherein the active actuator comprises one of an electromechanical cylinder, a linear motor, a hydraulic cylinder, pneumatic cylinder, and a combination thereof;

wherein the active actuator is adapted to be combined with a threaded spindle or a recirculating ball screw; and wherein the force equalization means comprises a toggle lever mechanism.

27. The method according to claim 26, wherein the force equalization means comprises a scissor-type foldable joint.

* * * * *